United States Patent [19]

Masaki et al.

[11] 4,119,074
[45] Oct. 10, 1978

[54] APPARATUS TO CONTROL THE RATIO OF AIR TO FUEL OF AIR-FUEL MIXTURE APPLIED TO AN INTERNAL COMBUSTION ENGINE

[75] Inventors: Kenji Masaki, Yokohama; Shigeo Aono, Seki, both of Japan

[73] Assignee: Nissan Motor Company, Ltd., Japan

[21] Appl. No.: 635,719

[22] Filed: Nov. 26, 1975

[30] Foreign Application Priority Data

Nov. 29, 1974 [JP] Japan .............................. 49/137546

[51] Int. Cl.² .......................................... F02M 23/04
[52] U.S. Cl. ......................... 123/124 B; 123/119 D; 123/124 R; 261/63; 60/276
[58] Field of Search ........... 123/124 R, 124 B, 119 D, 123/119 R, 32 EA, 32 AE; 261/63, 72 R; 60/276, 285

[56] References Cited

U.S. PATENT DOCUMENTS

| | | | |
|---|---|---|---|
| 3,759,232 | 9/1973 | Wahl | 123/119 D |
| 3,861,366 | 1/1975 | Masaki | 123/119 R |
| 3,921,612 | 11/1975 | Aono | 123/119 R |
| 3,970,052 | 7/1976 | Andoh | 123/119 D |

*Primary Examiner*—Ronald H. Lazarus

[57] ABSTRACT

Besides passages to conduct air into a carburetor, further air or fuel passages, communicated directly with an engine intake manifold, provide improved response to transient engine operating conditions. The delivery rate of air or fuel is controlled by an electromagnetic valve in accordance with an exhaust signal that is processed in an electronic controller with a differentiating circuit.

11 Claims, 11 Drawing Figures

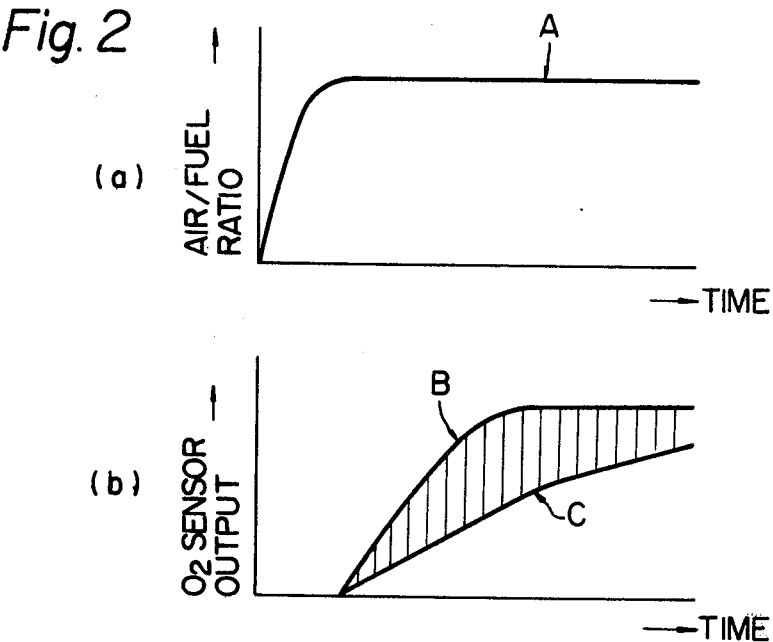
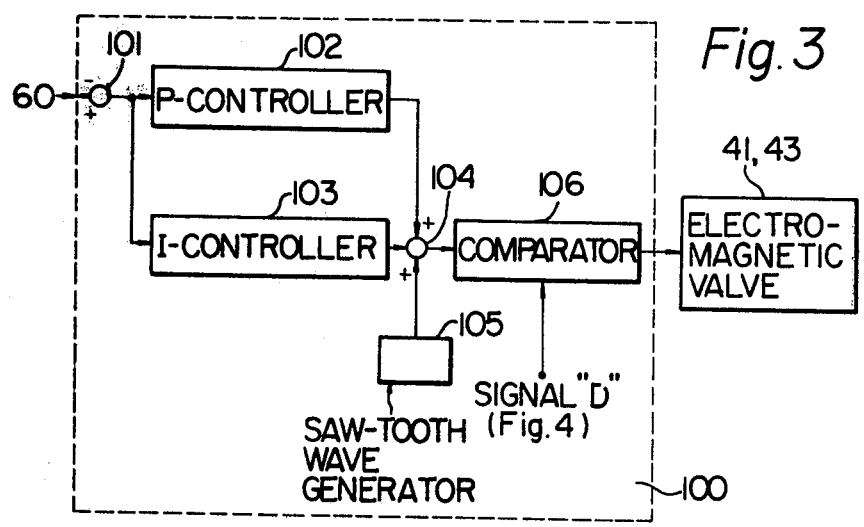

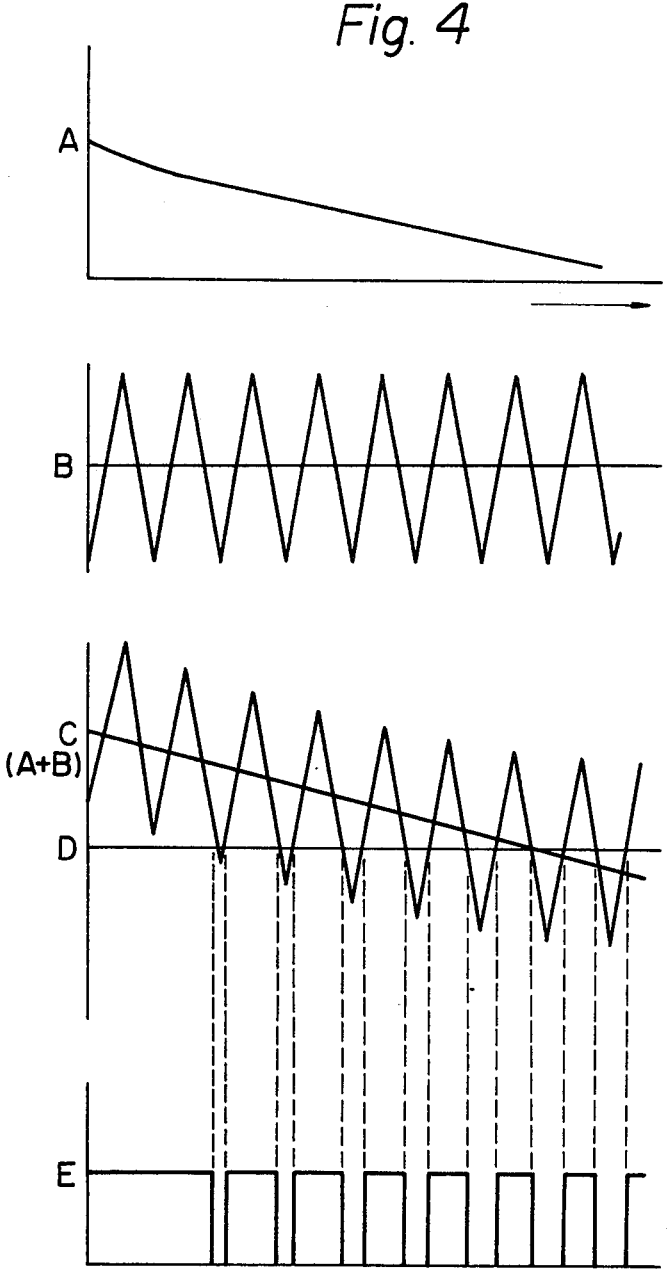

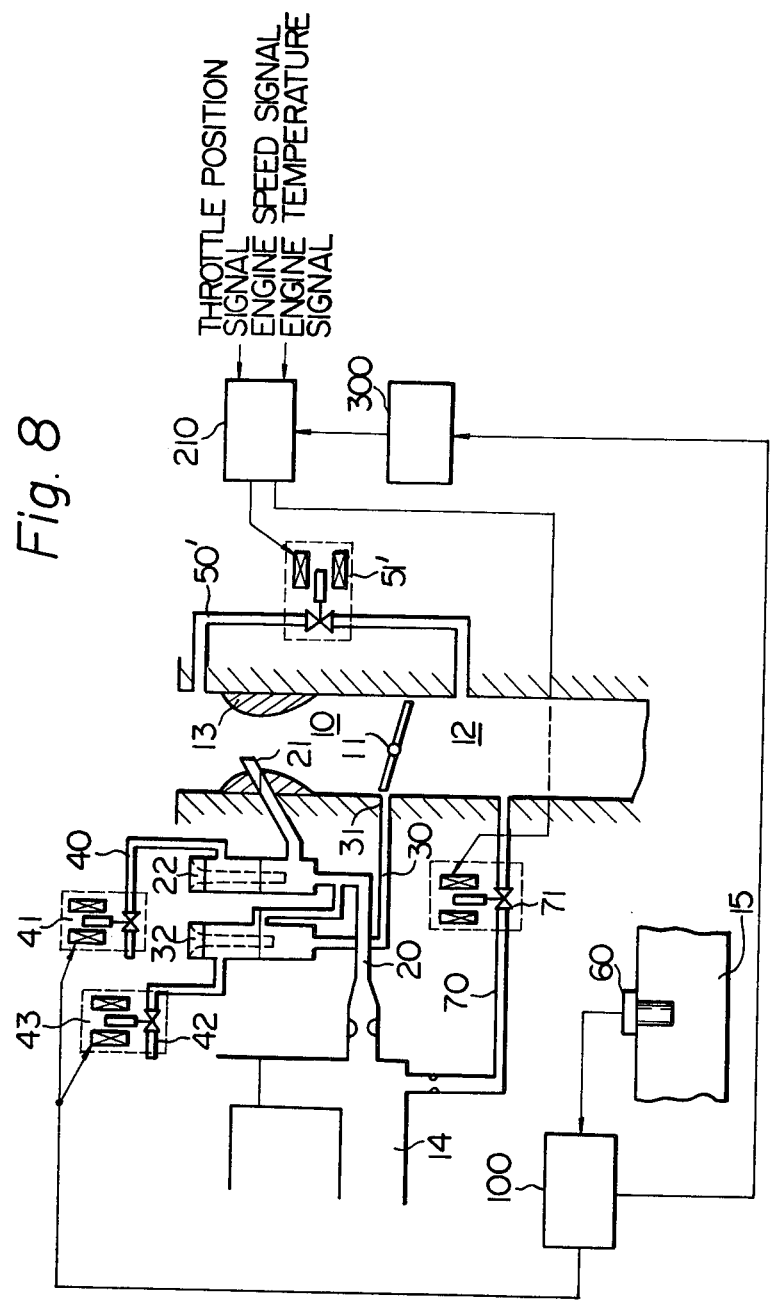

APPARATUS TO CONTROL THE RATIO OF AIR TO FUEL OF AIR-FUEL MIXTURE APPLIED TO AN INTERNAL COMBUSTION ENGINE

This invention relates to an apparatus to control the air/fuel ratio of the mixture being fed to an internal combustion engine and more particularly to an apparatus in which, additional combustible charge such as air and fuel is admitted into a carburetor in accordance with one or more sensed engine operating parameters or variables, e.g. the concentration of oxygen in the exhaust gases, to facilitate more accurate control of the air fuel mixture during transient modes of the engine.

There are already proposed a variety of control apparatus for carburetors in which, independently of an accelerator signal from an engine operator, the rate of combustible charge such as air and fuel fed to the engine is controlled in accordance with one or more measurable engine variables to provide an optimal air/fuel ratio, which may or may not be stoichiometric. In particular, an electronic feedback control system has been developed which is most effective for the purpose mentioned above: the command variable which depends on the value of the controlled variable, such as the concentration of oxygen in the engine exhaust gases, is sensed to produce a command signal. It is then applied to one or more electromagnetic valves provided in a fuel passage or to an additional air passage opening into the fuel passage for controlling the rate of air or fuel being admitted into the engine.

If, by way of example, insufficient oxygen is present in the exhaust gases indicating that the mixture is too rich, additional air is supplemented by the valves to provide a leaner air-fuel mixture.

The system of the type described is usually designed for steady-state control and as such, is efficient for stoichiometric air/fuel ratio control as long as the engine operates in the steady-state such as cruising. However, in a transient engine operation such as acceleration, such system will fail to compensate rapidly enough for the extraordinary variation of engine parameters.

Acceleration, deceleration, warming-up after cold engine starting, or sudden change in engine loading may be considered as transient engine conditions. The last condition occurs, by way of example, when starting an air conditioning system in a car equipped with same whereupon the engine operation is unstable and often fuel fails to be properly ignited particularly at idle.

It is therefore a primary object of this invention to incorporate an apparatus which not only achieves an adequate control of air/fuel ratio during steady-state operation but also provides a rapid response to transient engine conditions thereby adequately controlling the air/fuel ratio during same.

Another object of this invention is to provide, besides controlling the rate of additional combustible charge such as air and fuel admitted into the fuel passage, further air/fuel ratio control by regulating the rate of additional air and/or fuel which is directly admitted into an engine intake manifold in accordance with an exhaust sensor signal.

A further object of this invention is to provide, besides controlling the additional air being directly conducted into the intake manifold, further air/fuel ratio control by regulating the rate of additional fuel which is directly conducted from a fuel source into the intake manifold.

A still further object of the present invention is to achieve control of additional air and/or fuel also in accordance with one or more engine variable signals other than the exhaust sensor signal.

These and other objects, features and many of the advantages of this invention will be appreciated more readily as the invention becomes better understood by the following detailed description, when considered in connection with the accompanying drawings, wherein like parts in each of the several Figures are identified by the same reference characters, and wherein:

FIG. 1 is a view schematically showing a control apparatus according to a preferred embodiment of this invention;

FIGS. 2(a), and (b) are graphs illustrating the control characteristics according to this invention during different engine conditions;

FIG. 3 is a block circuit diagram showing a preferred example of circuit arrangement of a controller shown in FIG. 1;

FIG. 4 is a graph illustrating various waveforms generated by different elements of the FIG. 3 circuit;

Figure 6:
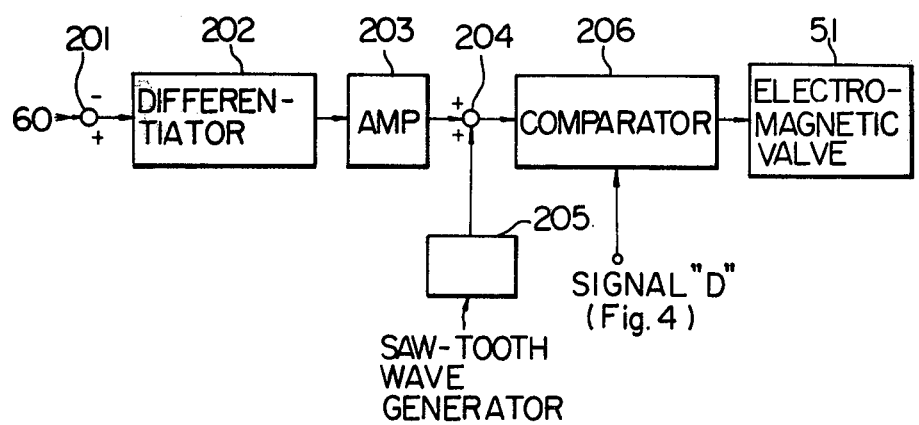
FIG. 6 is a block circuit diagram showing another preferred example of circuit arrangement of a controller shown in FIG. 1.
Figure 7:
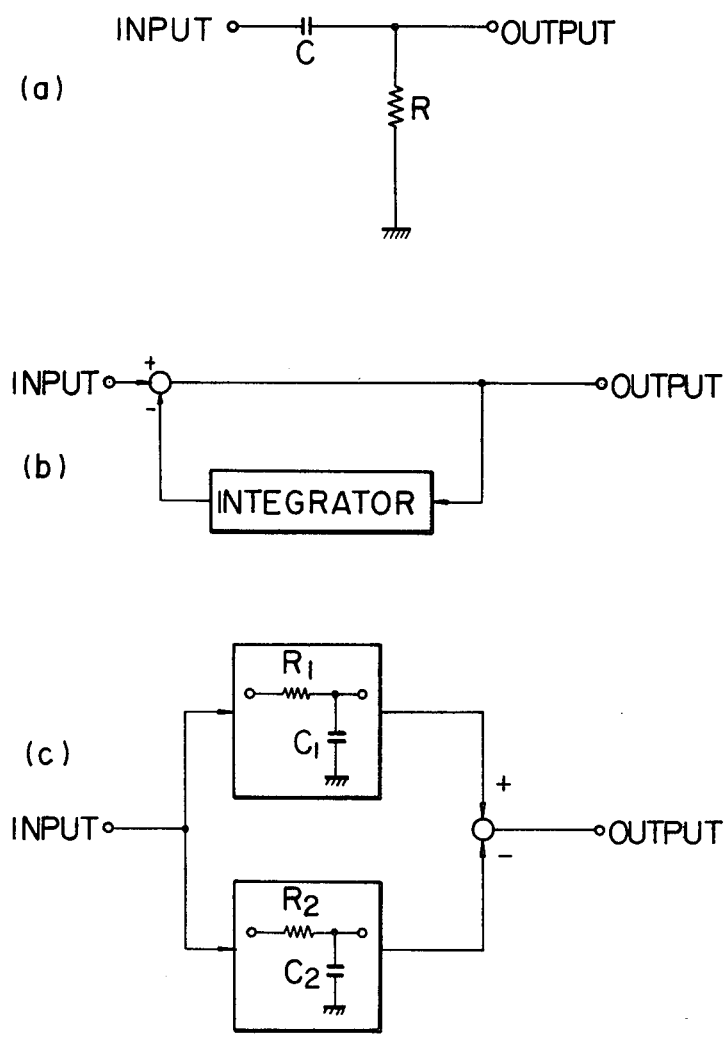

FIGS. 7(a), (b) and (c) are views showing design alternatives of circuit arrangement of an element shown in FIG. 6; and FIG. 8 is a view schematically showing a control apparatus according to another preferred embodiment of this invention.

Figure 1:
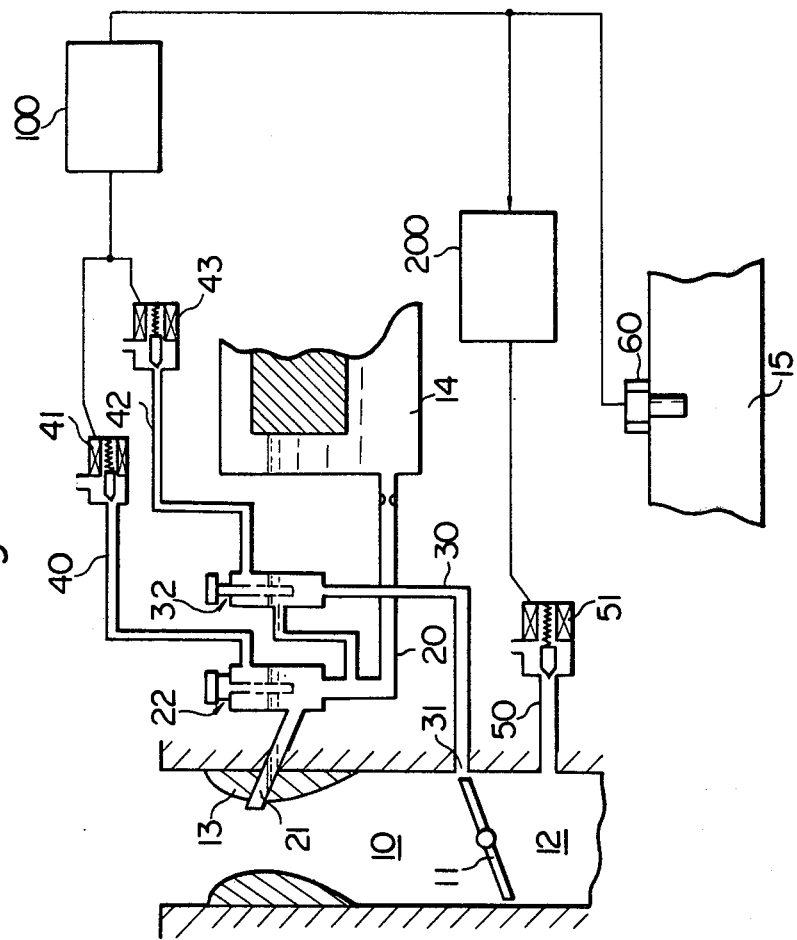

With reference to FIG. 1, a preferred embodiment of a feedback control apparatus according to this invention will now be explained. As is conventional, the engine (not entirely shown) comprises a carburetor forming part of the control apparatus which includes an intake passage 10 divided by a throttle valve 11 into an upstream portion with a venturi 13 and a downstream portion 12 directly communicating with an engine intake manifold. A main fuel passage 20 delivers fuel derived from a fuel source 14 to a main fuel nozzle 21 through which the fuel is injected into the venturi section of the intake passage 10. The fuel, before entering the main nozzle 21, is emulsified with air via a main air bleed passage 22 provided in the main fuel passage. Branching off from the main fuel passage 20 upstream of the main air bleed passage 22 is a slow fuel passage 30 which opens at 31 to the intake passage 10 in the neighbourhood of the closed throttle position. The fuel delivered through the slow fuel passage 30 is likewise emulsified via a slow air bleed 32.

The feedback control system further comprises additional air bleed passages 40 and 42 which are respectively provided to communicate with the main fuel passage 20 through the main air bleed passage 22 and with the slow fuel passage 30 through the slow air bleed passage 32. The volume of air passing through the passages 40 and 42 is controlled respectively by electromagnetic valves 41 and 43.

An exhaust gas sensor 60 is located in contact with the flow of exhaust gases in the exhaust manifold 15. It measures, for instance, the concentration of oxygen in the exhaust gases which varies in proportion to the air/fuel ratio of the input mixture and is therefore employed as a most appropriate control variable for such a feedback control apparatus. The sensor then produces a voltage signal proportional to the sensed concentration of oxygen. The signal is analyzed and processed by an electronic controller 100, such that deviation or difference of the sensed voltage signal from a predetermined reference signal is detected and a series of appropriate pulse signals are produced to be applied to the electromagnetic valves 41, 43 as will be later described in more detail. Thus, the electromagnetic valves are alternately moved to open and closed position to control, in accordance with the pulse signals, the rate of additional air through the passages 40 and 42 and accordingly the rate of fuel through the fuel passages 20 and 30, thus compensating for the afore-mentioned deviation from, for example the stoichiometric air-fuel ratio. If desired, the electromagnetic valves may be of an analog displacement type, instead of the ON-OFF acting valves, through all the embodiments according to this invention.

As has been described, the aforementioned control system does not provide a suitable transient response. One reason for this is that the additional air is introduced into the fuel passage and only after control of the air/fuel mixture has been established there, is it then supplied to the intake passage 10. In steadystate condition of the engine, this method of control is adequate for optimization of the output air/fuel ratio since deviation of the air/fuel ratio to the rich or lean side is relatively small and can be compensated for by the system during continuous operation thereof. In contrast, however the quick response necessary for air/fuel ratio control in a transient condition in which abnormally rich or lean mixture requirements arise in a momentary period cannot be met by the above mentioned arrangement.

Thus, in order to provide an improved, faster transient response, another additional air bleed passage 50 is provided according to this invention to directly communicate with the downstream portion 12 of the throttle valve or intake manifold. The passage 50 is likewise controlled by an electromagnetic valve 51 to allow or limit the additional air flow therethrough. The electromagnetic valve 51 is connected to the input of an electronic controller 200 the arrangement and characteristics of which may be identical with our different from that of the controller 100, as will be further described. A command variable is, as with the electromagnetic valves 41 and 43 previously referred to, an exhaust sensor signal which is applied to the input of the electronic controller 200. Although in the described embodiment the additional air under control is delivered directly to the throttle downstream, the use of additional fuel will provide the same control effect.

The control characteristics obtained by the arrangement above is illustrated in FIG. 2. When the required air/fuel ratio of the input mixture changes rapidly with respect to time as indicated by a curve A of FIG. 2(a), an appropriate signal is applied to the before mentioned valves. However as previously described the carburetor cannot change the air fuel ratio as rapidly as the signal commands. Thus the actual change in air fuel ratio is depicted in terms of exhaust sensor output and time in FIG. 2(b), curve C indicates the change in air/fuel ratio when only valves 41 and 43 are used. Curve B indicates the change in air/fuel ratio when valves 41, 43 and 51 are used. As is clearly seen, curve B closely parallels curve A indicating a very rapid change in air/fuel ratio.

An exemplary circuit arrangement of the electronic controller 100 is illustrated in FIG. 3. A command signal derived from the sensor 60 indicating the sensed concentration of oxygen is fed to a differential signal generator 101. The latter then generates an electrical signal representative of a differential value between the signal from the sensor 60 and a reference signal which, for instance, represents a stoichiometric air/fuel ratio. The signal representative of the differential value from the differential signal generator is then applied to a conventional p-i (proportional-integral) controllers 102, 103. The output signal from the p-i controller, a portion of which is depicted by reference character A in FIG. 4, is then added in an adder 104 to a series of saw-tooth wave signals B (FIG. 4) from a saw-tooth signal generator 105, providing the signal indicated by C in FIG. 4. The frequency of the saw-tooth wave signal may be desirably chosen, for instance, to be synchronized with the engine revolution speed. The signal C is then compared in a comparator 106 with a reference signal D at a predetermined fixed level to provide a series of output pulses E with different widths corresponding to the level of the command signal A. The series of pulses E is then applied to electromagnetic valves 41 or 43 to control ON-OFF operation thereof, such that if the exhaust sensor signal indicates the mixture being too rich, an increased amount of additional air is induced through the additional air bleed passage via open electromagnetic valves and vice versa.

Figure 5:
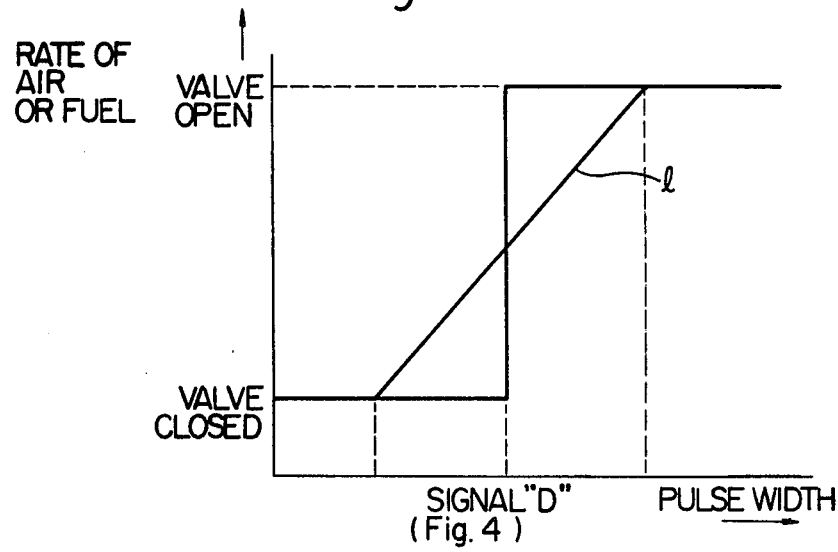
FIG. 5 is a graph illustrating the operation characteristics of an electromagnetic valve of FIG. 1 apparatus.

Since in actual operation there is a time delay not only in ON and OFF action of the electromagnetic valve but also in conductive capacity of the passages or conduits through which additional air or fuel is passed, the flow rate of air or fuel through the electromagnetic valve is linearly changed as indicated by the line $l$ in FIG. 5. Thus, a stable control operation is assured even with alternate ON-OFF movement of the electromagnetic valve.

Although the controller 200 may be similarly arranged as the controller 100 as mentioned above, an example of different circuit arrangement for the controller 200 is illustrated in FIG. 6. As shown, the p-i controller in FIG. 3 is replaced by a differentiating circuit 202 in this example. The differential signal from the differential signal generator 201 is herein differentiated by the differentiating circuit 202, the output signal of which is amplified in an appropriate amplifier 203. The process succeeding to amplification is identical with that of FIG. 3. It is evident that the controller 200 with the differentiating element, employed with the electromagnetic valve for the additional air directed to the intake manifold, exhibits a high efficiency for transient control operation.

Among the several transient conditions, acceleration and deceleration quite differently influence the ratio of the mixture delivered to the engine. It is therefore preferable to utilize different amplifier gains at the amplifier 203, depending on whether the output signal from the differentiator circuit 202 is at acceleration and at deceleration. Of course, it will provide a more precise control if more than one signal representative of transient engine variables such as throttle valve position or intake manifold vacuum are additionally used to correct the output signal from the amplifier.

FIGS. 7(a), (b) and (c) illustrate three design alternatives of arrangement of the differentiating circuit 202. FIG. 7(a) shows a differentiating circuit of an ordinary structure consisting of a capacitor C and a resistor R. In FIG. 7(b), an integrator is connected to an input of a difference detector so that an approximate differentiation is given by providing a difference between an input signal and an integrated value of the input signal. In FIG. 7(c), an input signal is applied to a circuit with time lag of first order consisting of a resistor $R_1$ and a capacitor $C_1$ and to another circuit with time lag of first order consisting of a resistor $R_2$ and a capacitor $C_2$ which is parallel with the aforementioned circuit. A difference is then produced between the output signals from both the circuits, which indicates an approximately differentiated value of the input signal.

Referring to FIG. 8, another preferred embodiment of the present invention is described as follows. Like the embodiment already described, there are provided additional air bleed passages 40 and 42 respectively communicating with the main fuel passage 20 and the slow fuel passage 30. The passages 40 and 42 are controlled by the respective electromagnetic valves 41 and 43 which in turn are controlled by the controller 100 in accordance with the exhaust sensor signal from the sensor 60. The apparatus heretofore described provides an optimal control of the air/fuel ratio of the mixture under the steady-state operation condition of the engine as at cruising.

According to this embodiment, another additional air bleed passage 50' is derived from the intake passage 10 at a portion slightly upstream of a venturi section 13 and fluidly communicates with the intake manifold 12, bypassing the throttle valve 11. Further according to this embodiment, an additional fuel passage 70 is provided to connect the fuel source 14 directly to the throttle downstream or intake manifold 12. The passages 50' and 70 are respectively controlled by electromagnetic valves 51' and 71.

Another electronic controller 210 is provided commonly to the valves 51' and 71 for selective operation thereof in a manner as will be further described. The controller 210 is electrically connected to the controller 100 to be dependent on the operation of the latter. Disposed between the both controllers 210 and 100 is a switching circuit 300, the function of which will be apparent later.

In operation of the apparatus according to this embodiment, if deviation of the exhaust sensor signal from the reference signal lasts for a preset, prolonged period of time, indicating a transient engine condition, the switching circuit 300 connected to the exhaust sensor through the controller 100 detects this condition producing a threshold trigger signal. Detection of the threshold signal may be achieved at any other stage of the controller 100, for instance at the output of the differential signal generator 101 or at the output of the comparator 106. The threshold signal is then delivered to the controller 210, whereupon the latter is rendered operative to actuate the electromagnetic valve 51' or 71 in accordance with several engine variable signals that will be further described. The controller 210 has, other than the input for the threshold signal, several inputs to which the engine variable signals are applied.

The engine variable signals are those particularly representative of engine transient condition such as engine speed, throttle valve position, manifold vacuum, engine temperature and the like. These variables are measured at different parts of the engine by appropriate sensors as are well known per se, though not shown, and the produced signals are applied to the respective inputs of the controller 210. As soon as the controller 210 is triggered by the threshold signal from the switching circuit 300, it analyzes these input engine variable signals and produces an output signal indicative of a particular transient engine condition, which is applied to the valve 51' and/or 71. By way of example, when the throttle valve is rapidly closed for deceleration, the controller output signal indicating an initial deceleration is applied to the electromagnetic valve 51'. In this instance of deceleration, a considerable volume of fuel still continues to enter the combustion chamber in a momentary of period of time, due to the inertia of the fuel flow. This relative increase in fuel with respect to the volume of air is compensated for by conducting additional air into the intake manifold via the electromagnetic valve 51' acting in response to the signal from the controller 210. After the initial deceleration, the mixture is being diluted because of abnormally high intake manifold vacuum, often causing improper firing. In order to then enrich the diluted mixture, the additional fuel is delivered to the intake manifold via the electromagnetic valve 71 in accordance with the output signal from the controller 210.

The apparatus according to this invention thus provides a precise control to compensate for transient parameter variation, such that idle engine speed is raised by supplying additional fuel during warming-up after cold starting; emission control is promoted by optimizing the air/fuel ratio at acceleration or deceleration; engine operation is stabilized at sudden change of engine loading as at starting an air conditioning system, etc.

What is claimed is:

1. A combination with an apparatus to control the ratio of air to fuel of an air-fuel mixture being admitted into an internal combustion engine having an intake passage, an exhaust passage and a throttle valve located in said engine intake passage, including
   means sensing at least one engine operating variable which is related to the ratio of air to fuel of the mixture delivered to the engine and generating an output signal proportional to the sensed variable,
   a main fuel passage for delivering fuel to a portion of the engine intake passage upstream of the throttle valve and having a main air bleed,
   a slow fuel passage for delivering fuel to a portion of the engine intake passage in the neighborhood of the closed throttle position and having a slow air bleed,
   a first additional air passageway connected between said main air bleed and the atmosphere,
   a second additional air passageway connected between said slow air bleed and the atmosphere,
   a first electromagnetic means provided in said first additional air passageway to control the rate of air passing therethrough,
   a second electromagnetic means provided in said second additional air passageway to control the rate of air passing therethrough,
   passage means conducting air and fuel components of a combustible charge directly into a portion of the engine intake passage downstream of the throttle valve,
   a third electromagnetic means provided in said passage means to control the rate of said components passing therethrough, and
   electronic control means electrically connected with said first, second and third electromagnetic means to control the same in accordance with said output signal.

2. A combination as defined in claim 1, in which said passage means comprises a conduit connected between the atmosphere and a portion of the engine intake passage downstream of the throttle valve to conduct atmospheric air into the engine intake passage.

3. A combination as defined in claim 1, in which said passage means comprises a conduit connected between a source of fuel supply and a portion of the intake passage downstream of the throttle valve to conduct fuel into the engine intake passage.

4. A combination as defined in claim 1, in which said passage means comprises a first conduit connected between the atmosphere and a portion of the engine intake passage downstream of the throttle valve and a second conduit connected between a source of fuel supply and a portion of the engine intake passage downstream of the throttle valve.

5. A combination as defined in claim 1, in which said sensing means comprises an oxygen sensor located in fluid contact with exhaust gases in the engine exhaust passage to produce a voltage signal representative of the concentration of oxygen in the exhaust gas.

6. A combination as defined in claim 1, in which said air bleeds comprise a main air bleed conduit opening to the engine intake passage upstream of the throttle valve and a slow and idle air bleed conduit opening to the engine intake passage in the neighborhood of the closed throttle valve.

7. A combination as defined in claim 5, in which said electronic control means comprises a differential signal generator connected with said exhaust gas sensor and responding to said voltage signal to produce a differential signal indicative of a difference between the voltage signal and a predetermined threshold signal, means integrating said differential signal to produce an integrated signal, and means producing an output signal in the form of a series of pulses in accordance with the level of said integrated signal and delivering said output signal to the both of said electromagnetic means in said additional air passageway and in said passage means.

8. A combination as defined in claim 7, in which said control means further comprises means producing a proportional signal proportional to said differential signal.

9. A combination as defined in claim 5, in which said electronic control means comprises a first control unit including a differential signal generator connected with said exhaust gas sensor and responding to said voltage signal to produce a differential signal indicative of a difference between the voltage signal and a predetermined threshold signal, means integrating said differential signal to produce an integrated signal, and means producing an output signal in the form of a series of pulses in accordance with the level of said integrated signal and delivering said output signal to said electromagnetic means in said additonal air passageway and a second control unit including a differential signal generator connected with said exhaust gas sensor and responding to said voltage signal to produce a differential signal indicative of a difference between the voltage signal and a predetermined threshold signal, means differentiating said differential signal to produce a differentiated signal, and means producing an output signal in the form of series of pulses in accordance with the level of said differentiated signal and delivering said output signal to said electromagnetic means in said passage means.

10. A combination as defined in claim 9, in which said first control unit further includes means producing a proportional signal proportional to said differential signal.

11. A combination as defined in claim 1, in which said sensing means comprises means producing signals representative of throttle valve position, engine speed, and engine temperature.

* * * * *